United States Patent [19]

Coburn, Jr.

[11] Patent Number: 4,959,254

[45] Date of Patent: Sep. 25, 1990

[54] WEB WITH AUXILIARY HOLES

[76] Inventor: Joseph W. Coburn, Jr., 953 Princewood Ave., Lakewood, N.J. 08701

[21] Appl. No.: 446,860

[22] Filed: Dec. 6, 1989

[51] Int. Cl.[5] .................................................. B32B 3/10

[52] U.S. Cl. .................................... 428/131; 428/192; 226/87; 281/5

[58] Field of Search .......................... 428/81, 131, 192; 282/11.5 A, 16 B, 21 C, 21 D; 226/87, 77, 76; 281/5

[56] References Cited

U.S. PATENT DOCUMENTS

| | | | |
|---|---|---|---|
| 2,352,757 | 7/1944 | Barker | 282/11.5 A |
| 4,708,901 | 11/1987 | Wood | 428/131 |
| 4,867,363 | 9/1989 | Wood et al. | 226/87 |

*Primary Examiner*—Alexander S. Thomas

*Attorney, Agent, or Firm*—R. Gale Rhodes, Jr.

[57] ABSTRACT

A web having its longitudinally extending side edge portions provided with a plurality of standard feed holes uniformly spaced from each other for receiving standard feed pins provided on feed sprockets and which side edge portions are also provided with a plurality of auxiliary holes larger than the standard feed holes and wherein one auxiliary hole is located intermediate each pair of adjacent feed holes to permit the auxiliary holes to receive the additional pin during feeding of the web regardless of the circumferential location of the additional pin on the sprockets and wherein the auxiliary holes are sufficiently large to receive the additional pin provided between a pair of adjacent standard feed pins on the sprocket regardless of the circumferential location of the additional pin between the pair of adjacent standard feed pins.

2 Claims, 2 Drawing Sheets

WEB WITH AUXILIARY HOLES

BACKGROUND OF THE INVENTION

This invention relates generally to a new and improved web for feeding into or through web handling machines such as sign makers, plotters, recorders and the like, wherein the web is fed longitudinally by a pair of feed sprockets cooperating with feed holes provided in the two longitudinal side edge portions of the web, and more particularly relates to a new and improved web provided with auxiliary holes extending along its longitudinal side edge portions in addition to the standard feed holes, with an auxiliary hole located between each pair of adjacent standard feed holes, and which new and improved web may be fed through such web handling machines regardless of whether or not the sprockets of such machines are provided with additional or extra pins intermediate adjacent pairs of standard feed pins.

As known to the art, for various purposes, feed sprockets of web handling machines of the above-noted types can have their feed sprockets provided with extra or additional pins intermediate standard feed pins and such extra feed pins can be located at different circumferential location's between pairs of adjacent standard feed pins and can be located at different circumferential locations on the sprockets.

An example of feed sprockets provided with such extra or additional pins, and a web for use therewith provided with extra or additional holes between adjacent pairs of standard feed holes, is disclosed in U.S. Pat. No. 4,834,276 patented May 30, 1989 entitled WEB LOADING AND FEEDING SYSTEM, RELATED WEB CONSTRUCTION AND METHOD AND APPARATUS FOR MAKING WEB, David J. Logan inventor and assigned to Gerber Scientific Products, Inc. The teaching of this patent is that the extra or additional pins provided on the sprockets visually distinguish certain pairs of standard feed pins and that the extra or additional holes provided in the web visually distinguish certain pairs of standard feed holes on the web and that these visually distinguished pairs of standard feed pins and pairs of standard feed holes permit the ready alignment of the web with the sprockets and prevent damage or ruin of the web due to web-sprocket misalignment as to the web is advanced into the web handling machine. It is stated in this patent that this misalignment problem is particularly prevalent when the web is very wide, and it is difficult to determine by the eye which sprocket pins correspond with one another and which feed holes on the opposite sides of the web correspond with one another. The above-noted patent includes claims covering a web loading and feeding system wherein the included sprockets are provided with visually distinguishing means, e.g. an extra or additional pin between an adjacent pair of standard feed pins, and claims a web wherein the two longitudinal side edge portions of the web are provided with visually distinguished means, e.g. an extra or additional hole between adjacent pairs of standard feed holes. Since there are many machines in the field covered by the web handling and feeding system claims of the patent, heretofore only webs covered by the web claims of the patent can be used on such web handling and feeding machines and others without permission to manufacture and sell webs covered by the web claims are precluded from making and selling webs for use on such web handling and feeding systems.

The inventor of the present web invention has found such stated web-sprocket misalignment not to be a typical problem because the typical web used on such web handling machines is about 15 inches wide and an operator generally has no problem in correctly aligning the web fed holes with the sprocket fed pins.

Accordingly, to promote commerce, there exists a need in the art for a new and improved web which may be used on web handling and feeding systems covered by the claims of the above-noted patent but which webs are not covered by the web claims of such patent.

SUMMARY OF THE INVENTION

The object of the present invention is to satisfy the foregoing need in the web feeding art.

A web satisfying such need and embodying the present invention may have its longitudinally extending side edge portions provided with a plurality of standard feed holes uniformly spaced from each other for receiving standard feed pins provided on feed sprockets and which side edge portions may also be provided with a plurality of auxiliary holes larger than the standard feed holes and wherein one auxiliary hole is located intermediate each pair of adjacent feed holes to permit the auxiliary holes to receive said additional pin during feeding of said web regardless of the circumferential location of said additional pin on the sprockets and wherein the auxiliary holes are sufficiently large to receive the additional pin provided between a pair of adjacent standard feed pins on the sprocket regardless of the circumferential location of the additional pin between the pair of adjacent standard feed pins.

DESCRIPTION OF THE PREFERRED EMBODIMENT

Figure 1:
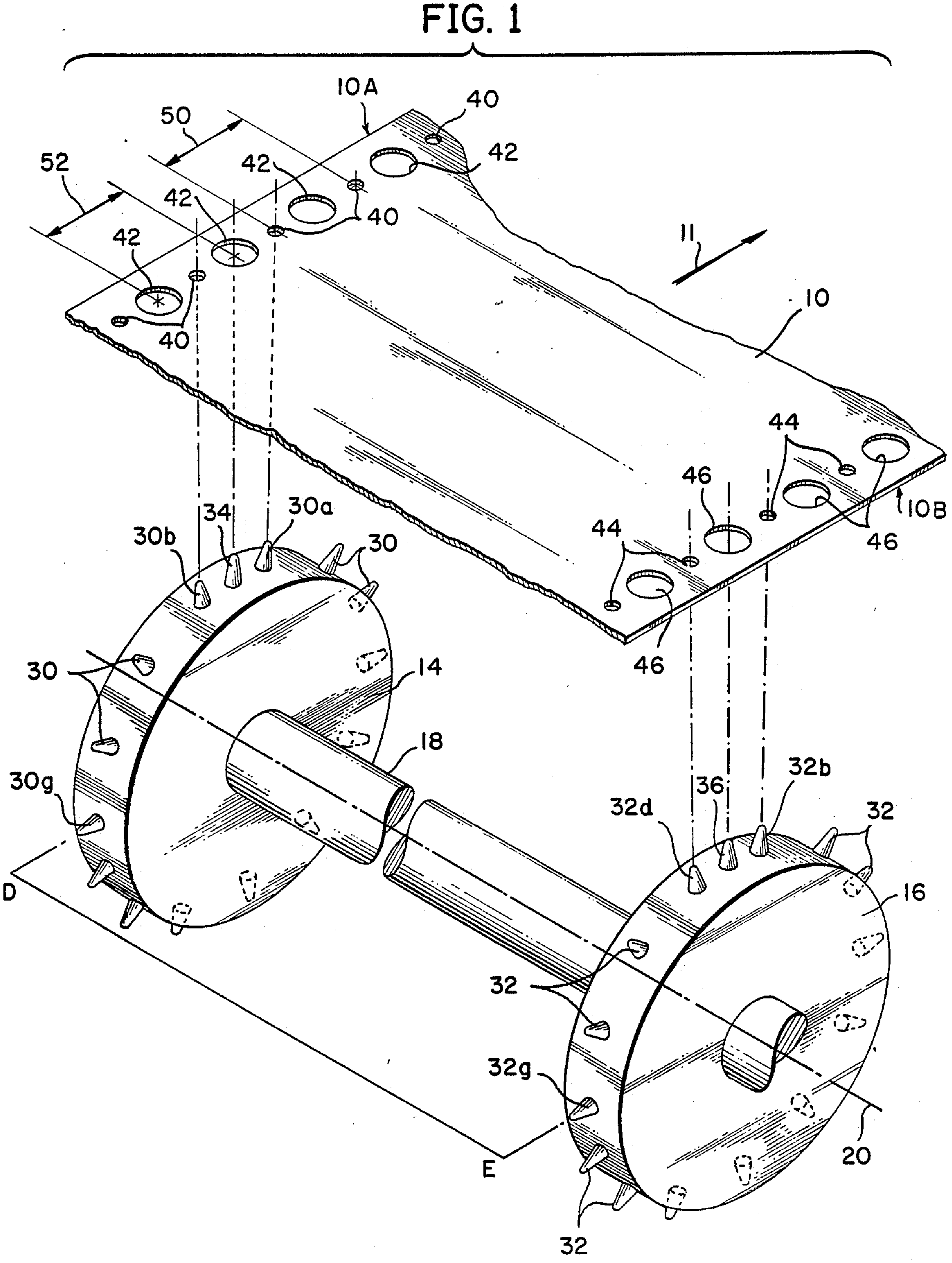
FIG. 1 is a fragmentary perspective view showing the relationship between the pins extending radially outwardly circumferentially of the drive sprockets and the holes provided along each longitudinally extending side edge portion of the web embodying the present invention.
Figure 2:
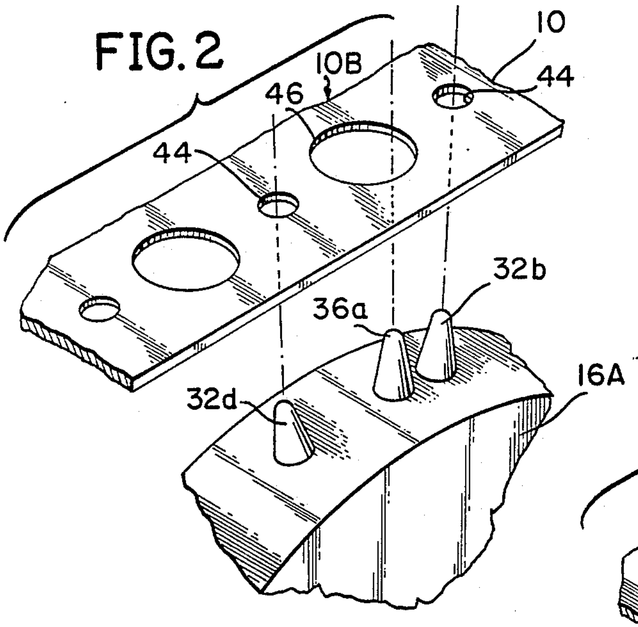
FIGS. 2–5 are fragmentary perspective views illustrating the universal utility of the web embodying the present invention and the manner in which an auxiliary holes thereof will receive and permit the advancement of the web by drive sprockets regardless of the circumferential location of the extra pin between an adjacent pair of standard feed sprockets, regardless of the circumferential location of the extra or additional pin on the sprocket and, in FIG. 5, the manner in which an auxiliary hole provided in the web of the present invention will receive more than one extra pin provided between a pair of adjacent standard feed pins.

Referring now to FIG. 1, there is illustrated a web identified by general numerical designation 10 embodying the present invention and a pair of prior art feed sprockets 14 and 16 mounted for rotation on a common shaft 18 having an axis 20; feed sprockets may be, for example, feed sprockets 14 and 16 illustrated in FIG. 2 of the above-mentioned U.S. Pat. No. 4,834,276. Sprocket 14 is provided with a plurality of radially outwardly extending standard feed pins 30 and an extra or additional radially outwardly extending pin 34 intermediate the pair of adjacent standard feed pins **30*a*** and 30c, standard feed pins 30 are uniformly spaced from each other circumferentially of the sprocket 14. Sprocket 16 is provided with a plurality of radially outwardly extending standard feed pins 32 circumferentially thereof and a radially outwardly extending extra or additional pin 36 located intermediate the pair of adjacent standard feed pins 30*b* and 30*d*; standard feed pairs 32 are uniformly spaced from each other circumferentially of the sprocket 16. Each standard feed pin on each sprocket 14 and 16 is associated with a standard feed pin on the other sprocket and associated standard feed pins lie substantially in the same plane containing the axis 20 of the shaft 18, e.g. note standard feed pin 30*g* on sprocket 14 which lies substantially in the same plane D–E including the shaft axis 20 as the standard feed pin 32*g* on sprocket 16.

Referring now particularly to web 10 embodying the present invention, FIG. 1, it will be understood that web 10 is provided with two longitudinally extending side edge portions indicated by general numerical designations 10A and 10B. Side edge portion 10A is provided with a plurality of standard feed holes 40 uniformly spaced from each other and for receiving the standard feed pins 30 provided on the sprocket 14 to feed the web longitudinally in the direction of the arrow 11 upon rotation of the sprocket 14. In addition, side edge portion 10A is also provided with a plurality of auxiliary holes 42 larger than the standard feed holes 40 and wherein an auxiliary hole 42 is located intermediate each adjacent pair of standard feed holes 40. Similarly, side edge portion 10B is provided with a plurality of standard feed holes 44 uniformly spaced from each other and for receiving the standard feed pins 36 provided on the sprocket 16 to feed the web 40 longitudinally in the direction of the arrow 11 upon rotation of the sprocket 16. In addition, side edge portion 10B is also provided with a plurality of auxiliary holes 46 larger than the standard feed holes 44 and wherein an auxiliary hole 46 is provided intermediate each pair of adjacent standard feed holes 44.

Thus, it will be understood, and in accordance with the teachings of the present invention, that upon the standard feed holes 40 located in side edge portion 10A and the standard feed holes 44 located in the side edge portion 10B receiving, respectively, the standard feed pins 30 provided on sprocket 14 and standard feed pins 32 provided on sprocket 16, the respective auxiliary holes 42 and 44 will receive the additional pin 34 provided on sprocket 14 and additional pin 36 provided on sprocket 16 and permit longitudinal feeding of the web 10 by the sprockets regardless of the circumferential location of the additional pins 34 and 36 on their respective sprockets 14 and 16. This is because in accordance with the teachings of the present invention, an auxiliary hole 42 is provided intermediate each pair of adjacent standard feed holes 40 on side edge portion 10A and an auxiliary hole 46 is provided intermediate each pair of adjacent standard feed holes 44 on the edge portion 10B. Hence, regardless of the circumferential location of the extra pins on the feed sprockets, such as extra pins 34 and 36 provided respectively on the sprockets 14 and 16, the auxiliary holes 42 and 46 will receive such extra or additional pins regardless of their circumferential location on the sprockets and permit longitudinal feeding of the web 10 by the standard feed holes 40 and 44 cooperating with the standard drive pins 30 and 32.

Figure 3:
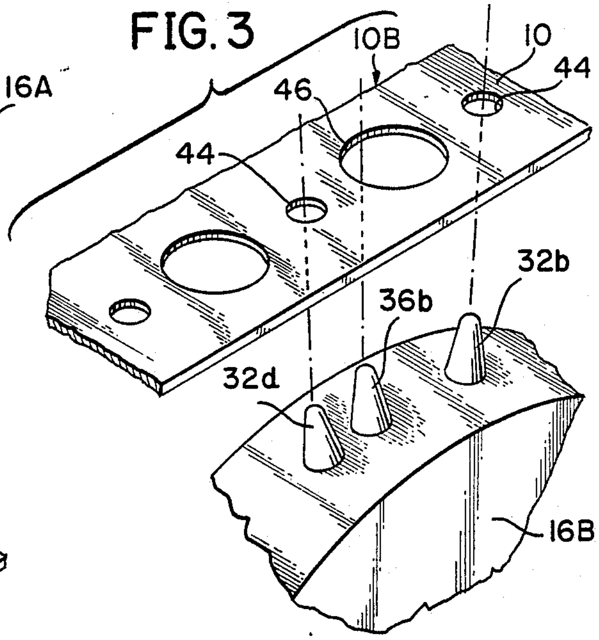
Figure 4:
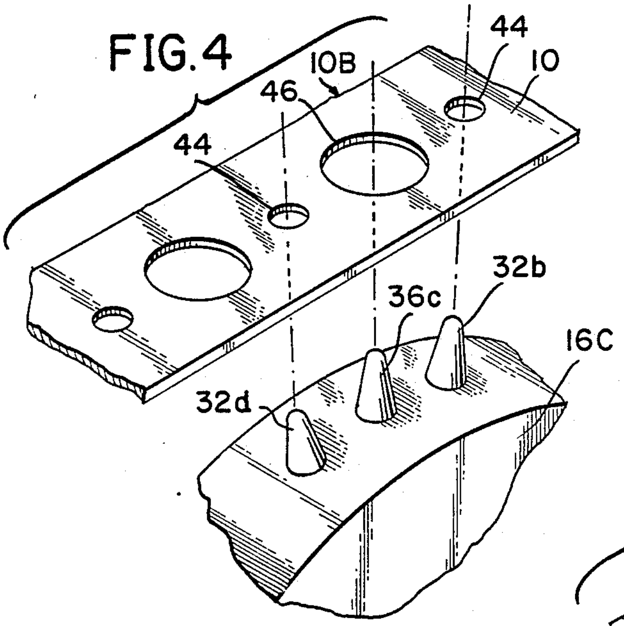

Referring now to FIGS. 2, 3 and 4, a further teaching of the present invention is illustrated with regard to auxiliary hole 46 shown in each of these FIGS. but which hole 46, it will be understood, is representative of auxiliary holes 42 provided in side edge portion 10A of the web 11 and auxiliary holes 46 provided in side edge portion 10B of the web 10 of FIG. 1. This further teaching is that the auxiliary holes, e.g. auxiliary hole 46 in FIGS. 2, 3 and 4, are sufficiently large to receive an additional pin intermediate a pair of adjacent standard feed pins, e.g. adjacent pairs of standard feed pins 32*b* and 32*d* shown in such FIGS., regardless of the circumferential location of such additional pin between the adjacent pairs of adjacent standard feed pins. For example, in FIG. 2, additional pin 36*a* is located intermediate pair of adjacent standard feed pins 32*b* and 32*d* but is located closer to standard feed pin 32*b* than to standard feed pin 32*d*. In FIG. 3, additional pin 36*b* intermediate pair of adjacent standard feed pins 32*b* and 32*d* is located closer to standard feed pin 32*d* than to standard feed pin 32*b*, and in FIG. 4, additional pin 36*c* intermediate pair of adjacent standard feed pins 32*b* and 32*d* is located substantially equidistant from the standard feed pins. Yet, in each of these three examples, the auxiliary hole 46 is sufficiently large to receive the additional pin regardless of its circumferential location intermediate the pair of adjacent standard feed pins 32*b* and 32*d*, upon the standard feed holes 44 receiving the standard feed pins 32*b* and 32*d* to feed the web 10 longitudinally in the direction of the arrow 11 in FIG. 1.

Figure 5:
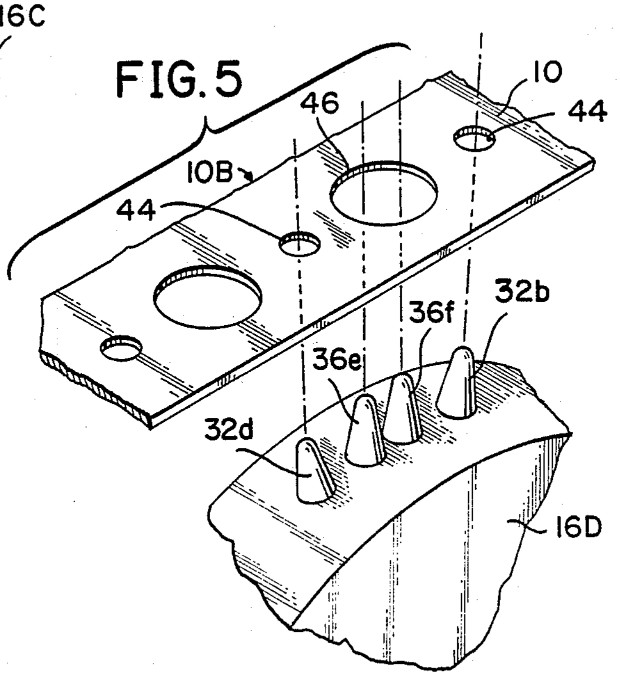

It will be still further understood with reference to FIG. 5, that the representative auxiliary hole 46 is sufficiently large to receive more than one additional pin, such as pair of additional pins 36*e* and 36*f*, located intermediate adjacent pair of standard feed pins 32*b* and 32*d* upon the standard feed holes 44 receiving the standard feed pins 32*b* and 32*d*, to longitudinally advance the web 10.

In one embodiment of the present invention, and referring again to FIG. 1 for convenience of understanding and reference, the standard feed holes, e.g. standard feed holes 40 and 44, were about 1/16 inch in diameter and were spaced apart on about ⅜ inch centers (arrow 50 in FIG. 1) and the auxiliary holes 42 and 46 were about 3/16 inch in diameter and were spaced apart on about ⅜ inch centers (arrow 52 in FIG. 1).

Lastly, it will be further understood that may variations and modifications may be made in the present invention without deparating from the spirit and the scope thereof.

What is claimed is:

1. A web for feeding on a pair of feed sprockets rotatable about a common axis and each sprocket provided with a plurality of radially outwardly extending standard feed pins uniformly spaced from each other circumferentially of said sprocket, each standard feed pin on each sprocket associated with a standard feed pin on the other sprocket and associated standard feed pins lying in substantially the same plane containing said common axis, at least one of said sprockets provided with at least one radially outwardly extending additional pin positioned intermediate an adjacent pair of said standard feed pins, said additional pin having a predetermined circumferential location between said adjacent pair of standard feed pins and having a predetermined circumferential location on said one sprocket, comprising:

a longitudinally extending web provided with two longitudinally extending side edge portions each provided with a plurality of standard feed holes uniformly spaced from each other and for receiving said standard feed pins to feed said web longitudinally upon rotation of said sprockets; and each of said side edge portions also provided with a plurality of auxiliary holes larger than said standard feed holes, one of said auxiliary holes located intermediate each pair of adjacent standard feed holes on each of said side edge portions to permit said auxiliary holes to receive said additional pin during feeding of said web regardless of the circumferential location of said additional pin on said one sprocket, and said auxiliary holes sufficiently large to receive said additional pin during feeding of said web regardless of the circumferential location of said additional pin between said pair of adjacent standard feed pins.

2. The web according to claim 1 wherein said standard feed holes are about 1/16 inch in diameter are spaced apart on about ⅜ inch center, and wherein said auxiliary feed holes are about 3/16 inch diameter and are spaced apart on about ⅜ inch centers.

* * * * *